United States Patent

Gerry

[15] 3,651,282

[45] Mar. 21, 1972

[54] DISTORTIONLESS MAGNETIC COMPONENTS

[72] Inventor: Martin E. Gerry, 13452 Winthrope Street, Santa Ana, Calif. 92705

[22] Filed: June 19, 1969

[21] Appl. No.: 840,121

Related U.S. Application Data

[63] Continuation-in-part of Ser. No. 599,335, Oct. 31, 1966, Pat. No. 3,504,229.

[52] U.S. Cl. ................................179/100.2 C, 340/174.1 F

[51] Int. Cl. ..........................................................G11b 5/12

[58] Field of Search .....................179/100.2 C; 340/174.1 F; 346/74 MC

[56] References Cited

UNITED STATES PATENTS

| | | | |
|---|---|---|---|
| 2,483,123 | 9/1949 | Clapp | 179/100.2 C |
| 2,850,582 | 9/1958 | De Raemy | 340/174.1 F |
| 3,079,467 | 2/1963 | Rettinger | 179/100.2 C |
| 3,399,393 | 8/1968 | Chang | 340/174.1 F |

OTHER PUBLICATIONS

N. M. Haynes, Elements of Magnetic Tape Recording, Prentice- Hall, Inc., 1957, pp. 98- 99, TK 5981 H33.

*Primary Examiner*—Terrell W. Fears
*Assistant Examiner*—Alfred H. Eddleman

[57] ABSTRACT

The principles and use of magnetic main core flux and ways for eliminating mutual flux components contributing to distortion in a group of magnetic devices results in these magnetic devices having better operating characteristics and hence results in better and higher fidelity products. Included are components such as record and reproduce heads. A basic core structure provides distortion-free properties in magnetic heads, and its use in computer applications contributes to faster computation time. The freedom from distortion enhances pulse handling ability, reduces the quantity of wave shape restoration components needed in equipment wherever used, and enables a greater amount of information to be stored in a smaller amount of space on a recording medium in view of the freedom from distortion components, which actually use up a large portion of frequency spectrum and hence recording space.

9 Claims, 9 Drawing Figures

DISTORTIONLESS MAGNETIC COMPONENTS

COPENDING PATENT APPLICATION

This application is a continuation-in-part of application Ser. No. 599,335, filed Oct. 31, 1966, now U.S. Pat. No. 3,504,229.

BACKGROUND OF THE INVENTION

This invention relates to the field of magnetic components such as record and reproduce heads treating phase and frequency distortion therein, the causes, and the criteria for elimination of these undesireable effects.

Related prior art in this field is mostly found in recording and reproducing heads, particularly the so-called flux responsive heads.

U.S. Pat. No. 2,855,464, issued Oct. 7, 1958, for an Electromagnetic Head, discusses a number of configurations of flux responsive heads. All heads utilize many windings in complex arrangements, and attempt to obtain flux responsive characteristics by balanced windings. The heads also utilize means for saturating small portions of the magnetic cores.

U.S. Pat. No. 2,704,789, issued Mar. 22, 1955, for a Multi-Channel Flux Responsive Magnetic Reproducer Head Unit, shows a separate core on which is wound a coil for providing high frequency excitation current for creating a changing flux. The separate core used therefor intersects perpendicularly the core structure of the head. The excitation or separate core is attached to a group of individual cores on which signal coils are wound. The basic principle involved is the establishment of orthogonal relationships between the high frequency flux and the signal flux. This relationship results in permeability change at the point of intersection of the two cores, which aledgedly prevents a voltage resulting from the high frequency excitation current from appearing across each recording gap of the individual cores.

U.S. Pat. No. 2,804,506, issued Aug. 27, 1957, for a Dynamagnetic Pick-Up System, which like U.S. Pat. No. 2,855,464, has complex windings within the core structure proper, obtained by drilling or stamping out holes in the flat portion of the core for the purpose of winding a coil about a narrow core portion, so that a small area of the core may have its reluctance changed according to the excitation frequency as well as magnetically saturating that small core area.

U.S. Pat. No. 2,165,307, issued July 11, 1939, for a Means for Translating Magnetic Variations into Electric Variations, utilizes a magnetic core as an integral part of an electron beam tube. A gap in the magnetic circuit external to the beam tube picks off a signal from a tape which is translated in the gap. The magnetic flux path which acts as a deflecting means of the electron beam, terminates at one end of the beam tube within the vicinity of the beam. The voltage output from the tube which is thereby produced is proportional to the flux amplitude of the flux within the gap in which the tape is translated.

All configurations of prior art do not attempt in their explanations, to find the basic reasons for the presence of distortion components of the modulated signal. Consequently, the prior art has not taught ways and means of establishing the basic relationships of the physical parameters constituting a distortion-free magnetic core structure. In view of lack of sufficient basic investigation, and in an attempt at minimizing recording surface area, prior art magnetic components become complex from both mechanical and electrical considerations, yet fail to eliminate or even minimize phase and frequency distortion resulting in their outputs.

Further disadvantages of prior art as related to magnetic logic components has resulted in limitation of the use of magnetic components due to the slow speed of counting, due to the comparatively large quantity of components required, and due to the unreliability of the magnetic component by virtue of the distortion content therein and unfavorable transient response characteristics to pulse-type signals.

In addition of failing to decrease the distortion parameters in the magnetic components, magnetic components utilized as logic gates have large negative transients in their output circuits. Negative transients are those portions of the electrical output signal preventing dependable operation of these circuits, that cross the zero axis and have electrical polarities opposite to the polarities of the desired signal, preventing reliable operation of the logic gate. When used as a record-reproduce head, negative transients produced in the process of recording or reproducing sound, contribute to amplitude as well as other undesired distortion phenomena.

Further disadvantages are due to the fact that a large quantity of magnetic tape or recording surface area is required for high fidelity recording. This situation also is disadvantageous in attempting to pulse-pack signals in computer applications where recording space allocations are frequently small, thereby limiting information transmission speed, storage, retrieval and processing of information.

Still further disadvantages in recording intelligence magnetically are due to the prevelant high distortion character of the wave being recorded, necessitating wave shaping circuits, filters and the like.

INVENTION OBJECTIVES

It is therefore an objective of this invention to investigate and teach the true reason for the presence of phase and frequency distortion in magnetic components.

It is another objective of this invention to establish ways and means and criteria for proper magnetic core structuring, and for simplifying magnetic components at the same time, and for virtually eliminating distortion components therein.

It is a further objective of this invention to eliminate negative transients and to avoid the need for wave shaping or waveform restoration circuits.

It is still a further objective of this invention to improve the reliability of operation of magnetic logic.

It is another objective of this invention to avoid amplitude distortion by elimination of negative transient response characteristics in the record or reproduce magnetic head.

It is still another objective of this invention to minimize the quantity of magnetic tape required in recording, and to provide for more efficient use of magnetic surface area, improve the quality and fidelity of recording, increase the capability of packing large quantity of pulses in a small amount of space thereby improving information transmission speed, storage, retrieval and processing by computers.

It is a further objective of this invention to record intelligence magnetically without attendant wave distortion thereby making it unnecessary to add additional wave shaping circuits and filters for restoration of the wave shape of the originating signal.

It is another objective of this invention to make magnetic logic computations practical by the overall increase in reliability, by the reduction of components required, by the increase in computation speed, by the increase in fidelity of pulse reproduction, by the increase in pulse packing capability, by the decrease in recording area required, by the decrease in wave shape restoration circuitry required, and by elimination of distortion in the recorded signal.

INVENTION SUMMARY

Briefly, this invention relates to magnetically responsive basic elements such as magnetic heads. The invention delves into the important and basic phenomena of mutual flux component effects upon flux responsive or modulation-type magnetic heads, and includes magnetic computer components. This is primarily due to the fact that the discovery of the undesired contributions made by the mutual flux components, due to the presence of high mutual inductances is found in the expansion of the nonlinear terms of the infinite series characterizing magnetic modulation.

It was realized from this development that the undesired phase and frequency distortion components resided in the mutual flux components, and it was further realized that creating multiple magnetic discontinuities within the core structure could essentially eliminate these undesired components, substantially without attenuation of the desired signal; this in clear opposition to the concepts expounded in the prior art.

The points of novelty residing in this invention include firstly a means of successfully controlling and minimizing mutual flux components in the magnetic structure, which are created by interaction of main core fluxes circulating therein. This is basically achieved by having multiple magnetic discontinuities of the core structure, achievable in a number of different ways. The conclusion derived, not only gives the parameters upon which control is required, but also gives quantitative measures of these parameters so that the degree of minimizing of the undesired distortion components may be predicted from the physical dimensions of the magnetic core structure. The results which lead to freedom from phase and frequency distortion are directly applicable to a group of magnetic species consisting of a flux responsive record head, a flux responsive reproduce head, as well as combinations derived from these species. The magnetic discontinuties interposed in the core structure provides a means for minimizing undesirable mutual flux components within the magnetic core structure. Analysis also shows the presence of very undesirable transients in these magnetic components not having multiple magnetic discontinuities in their core structures and shows that the elimination of these undesired transients occurs when these discontinuities are introduced, and also shows that by having these discontinuities it is possible to obtain better signal response fidelity.

Elimination of distortion is important as in the heads, as this avoids the use of wave shaping components and gets rid of undesirable transients which confuse the logic system attempting to recognize the signals. Likewise the heads being distortion-free when multiple discontinuities are incorporated therein, make possible more pulse packing in a smaller area of recording surface when used in connection with computer applications, and in high fidelity recordings and result in higher quality performance as well as broader frequency spectrum recording on a smaller recording surface area. The improved fidelity and the elimination of negative transients which is the term given to that portion of the electrical response output signal that crosses the zero axis and has an electrical polarity opposite to the polarity of the signal desired, contributes to better fidelity of response and avoids confusion of the logic circuits attempting to recognize the polarity of the pulse, wherein the positive and negative pulses are each relegated to identify a different state of logic. The elimination of negative transients in head applications provides a truer head response characteristic.

DRAWINGS

A better understanding of this invention is realized by reading the following detailed disclosure taken in conjunction with the drawings relating thereto of which:

Figure 7:
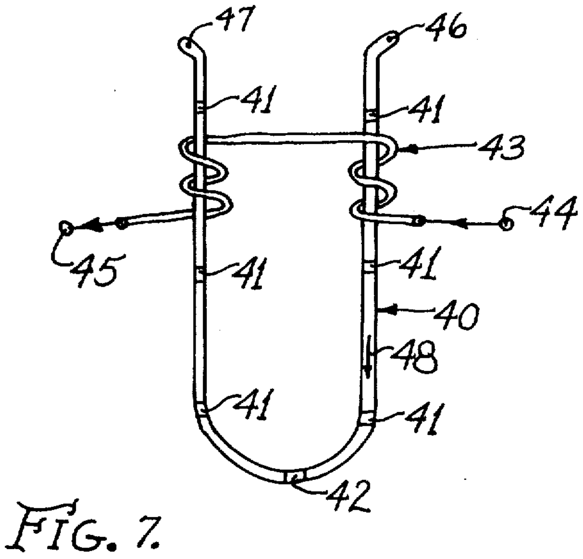
Figure 8:
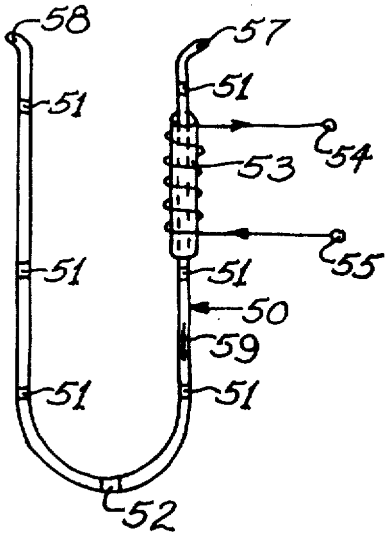
Figure 9:
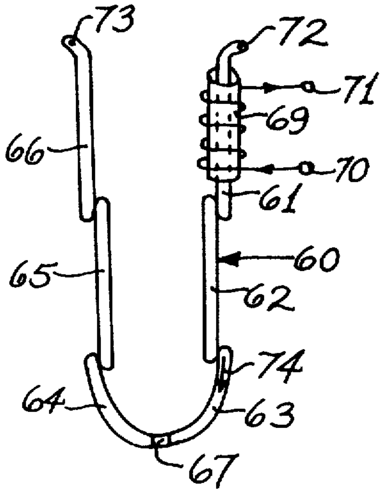

FIG. 7 is a plan view, partially in perspective, of an alternate exemplary embodiment of a magnetic recording head showing a hair pin type magnetic core with multiple magnetic discontinuities therein, the core which also serves as an inductance for conducting intelligence signals therethrough has wound on both legs thereof an insulated wire that serves as the winding bearing the carrier signal provided by connecting a carrier or bias voltage thereto;

FIG. 8 is a plan view, partially in perspective, of another alternate exemplary embodiment of a magnetic recording head showing a hair pin type of magnetic core with multiple magnetic discontinuities therein which also serves as an inductance for connecting intelligence signals thereto and having wound on one leg thereof a winding electrically insulated for the core for connecting thereto a carrier or bias voltage; and FIG. 9 is a plan view, partially in perspective, of another alternate exemplary embodiment of a magnetic recording head showing a hair pin type of magnetic core with multiple magnetic discontinuities in the core by attaching segmentary portions of the core to each other so that the ends thereof do not abut each other and serving as an inductance for connecting intelligence signals to the ends thereof, and having a winding insulated electrically from the core for connecting thereto a carrier or bias voltage.

AMPLITUDE MODULATION IN A MAGNETIC STRUCTURE WITH ANALYSIS OF DISTORTION COMPONENTS

Figure 1:
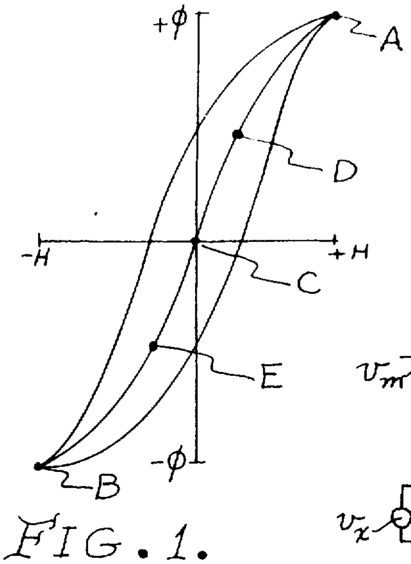
FIG. 1 is a graph of a typical magnetic core hysteresis loop applicable to all magnetic core structures of this invention.

This theoretical development applies to all magnetic structures disclosed herein. Referring to FIG. 1 which is a typical magnetic hysterysis loop of a core material such as used in conjunction with the heads and logic gates, there is shown in this figure saturation levels A and B of the core material. Some of the binary gates will be shown to be biased at saturation level A when not being triggered, one binary type NOT gate will be shown in combination with an amplifier which normally has an output when the gate is operating at point D prior to a pulse input to the gate and subsequently shift to either level A when the output desired is zero or to level E when the output desired is inverted or opposite to what is at the input of the gate. In the ternary case the normal biasing will be shown to be at point C or the magnetic origin prior to a pulse input to the gate and the operational point shifting either to point A or B when a pulse input is applied depending upon whether the pulse is positive or negative. In relation to the magnetic heads, the operating characteristics being alternating current responsive, the operation on the hysterysis loop may be described by the path ABA.

Figure 2:
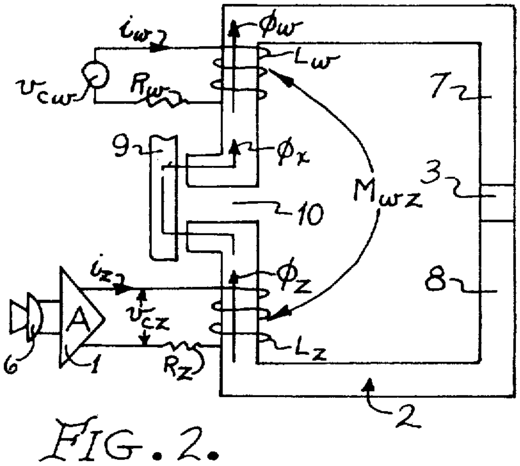
FIG. 2 is a schematic plan view of a magnetic flux responsive record head showing direction of windings thereupon, nonmagnetic spacers, direction of fluxes in the core and the mutual inductance between the two coils thereof, this figure being the basis for modulation theory development.

Hence also referring to FIG. 2, which is the basic structure used to develop the modulation effects theory, we see that two coils $L_w$ and $L_z$ have applied thereto voltages $v_{cw}$ and $v_{cz}$ respectively causing currents $i_w$ and $i_z$ to flow respectively encountering circuit impedances $Z_{(\omega)}$ and $Z_{(\beta)}$, the circuit impedances of the carrier frequency and the intelligence frequency respectively, through coils $L_w$ and $L_z$. Voltage $v_{cz}$ is applied from the output of amplifier 1. Mutual voltages $V_{mw}$ and $V_{mz}$ are respectively induced in coils $L_w$ and $L_z$ due to the change in currents in these coils. We shall therefore define the parameters of voltage, current, and flux as functions of time, and where $V_1$ and $V_2$ are the respective peak amplitudes of $V_{cw}$ and $V_{cz}$, and $\omega$ and $\beta$ are respectively the radio and audio frequencies in radians per second. Therefore, $$v_{cw}=V_1 \cos \omega t \qquad (1)$$

$$v_{cz}=V_2 \cos \beta t \qquad (2)$$

$$i_w=\frac{V_1}{Z_{(\omega)}} \cos \omega t \qquad (3)$$

$$i_z=\frac{V_2}{Z_{(\beta)}} \cos \beta t \qquad (4)$$

$$V_{mw}=-M_{wz}\frac{di_z}{dt}=\frac{M_{wz}V_2\beta}{Z_{(\beta)}} \sin \beta t \qquad (5)$$

$$V_{mz}=-M_{wz}\frac{di_w}{dt}=\frac{M_{wz}V_1\omega}{Z_{(\omega)}} \sin \omega t \qquad (6)$$

$$I_{mw}=\frac{V_{mw}}{Z_{(\omega)}}=\frac{M_{wz}V_2\beta}{Z_{(\omega)}Z_{(\beta)}} \sin \beta t \qquad (7)$$

$$I_{mz}=\frac{V_{mz}}{Z_{(\beta)}}=\frac{M_{wz}V_1\omega}{Z_{(\omega)}Z_{(\beta)}} \sin \omega t \qquad (8)$$

From the relationships, $$\text{Induced voltage}=-L\frac{di}{dt}=-N\frac{d\phi}{dt}=-M\frac{d\phi}{dt} \qquad (9)$$

$$\phi=\frac{B}{A} \qquad (10)$$

$$L=\frac{N^2}{L_c}\frac{d\phi}{dH}=\frac{N^2A}{L_c}\frac{dB}{dH}=\frac{N^2A}{L_c}\mu_e \qquad (11)$$

$$M_{wz}=k\sqrt{L_wL_z}=\frac{k\mu_eN_wN_z\sqrt{A_wA_z}}{L_c} \qquad (12)$$

where $i$ is the current in any coil due to applied voltage thereto, $L$ is the self inductance of each coil, $N$ is the number of turns of each coil, $M$ is the mutual inductance between two coils, $B$ is the flux density through a coil, $A$ is the area of the coil, $dB/dH=\mu_e=$ the effective permeability of the magnetic core circuit. $L_w$ and $L_z$ pertain to the self inductances of each coil, $M_{wz}$ is the mutual inductance between $L_w$ and $L_z$, $N_w$ and $N_z$ are the number of turns of coils $L_w$ and $L_z$ respectively, $A_w$ and $A_z$ are the areas of the coils $L_w$ and $L_z$ respectively, and $k$, is the coefficient of coupling between coils $L_w$ and $L_z$ which will play an important part in this discussion.

When two signals are injected in a nonlinear device such as coils on a magnetic core, a modulation effect of one signal upon the other results due to the cross products of the two signals. This is equally true of a vacuum tube or transistor modulator. What is meant by non-linearity is that the current does not change linearly with the voltage or visa versa.

A method of approximating the nonlinear effect of an electrical current may be taken from the infinite series, $$I_{mod}=I+\frac{I^2}{2!}+\frac{I^3}{3!}+\ldots \qquad (13)$$

which when translated in terms of equations (3), (4), (7) and (8), gives, $$I_{mod}=(i_w+i_z+I_{mw}+I_{mz})+\frac{1}{2!}(i_w+i_z+I_{mw}+I_{mz})^2+\frac{1}{3!}(i_w+i_z+I_{mw}+I_{mz})^3+\ldots \qquad (14)$$

$$\text{self induced flux}=\frac{L}{N}I,\ \text{mutually induced flux}=\frac{k\sqrt{L_wL_z}}{\sqrt{N_wN_z}}I \qquad (15)$$

Therefore, $$\phi_{mod}=(\phi_w+\phi_z+\phi_{mw}+\phi_{mz})+\frac{1}{2!}(\phi_w+\phi_z+\phi_{mw}+\phi_{mz})^2+\frac{1}{3!}(\phi_w+\phi_z+\phi_{mw}+\phi_{mz})^3+\ldots \qquad (16)$$

Therefore, considering equation (15) and applying equations (11) and (12) to equations (3), (4), (7), and (8), we obtain, $$\phi_w=\frac{V_1N_wA_w\mu_e}{Z_{(\omega)}L_c}\cos \omega t \qquad (17)$$

$$\phi_z=\frac{V_2N_zA_z\mu_e}{Z_{(\beta)}L_c}\cos \beta t \qquad (18)$$

$$\phi_{mw}=\frac{M_{wz}}{\sqrt{N_wN_z}}I_{mw}=\frac{k^2\mu_e(N_wN_z)^{3/2}A_wA_zV_2\beta}{Z_{(\omega)}Z_{(\beta)}L_c^2}\sin \beta t \qquad (19)$$

$$\phi_{mz}=\frac{M_{wz}}{\sqrt{N_wN_z}}I_{mz}=\frac{k^2\mu_e(N_wN_z)^{3/2}A_wA_zV_1\omega}{Z_{(\omega)}Z_{(\beta)}L_c^2}\sin \omega t \qquad (20)$$

Letting, $$A=\frac{V_1N_wA_w\mu_e}{Z_{(\omega)}L_c}$$

$$B=\frac{V_2N_zA_z\mu_e}{Z_{(\beta)}L_c} \qquad (21)$$

$$C=\frac{k^2\mu_e^2(N_wN_z)^{3/2}A_wA_zV_2\beta}{Z_{(\omega)}Z_{(\beta)}L_c^2}$$

$$D=\frac{k^2\mu_e^2(N_wN_z)^{3/2}A_wA_zV_1\omega}{Z_{(\omega)}Z_{(\beta)}L_c^2}$$

the expression for flux modulation is therefore as expressed in equation (16), where, $$\phi_x=\phi_{mod} \qquad (22)$$

$$\left.\begin{aligned}\phi_w&=A\cos \omega t\\ \phi_z&=B\cos \beta t\\ \phi_{mw}&=C\sin \beta t\\ \phi_{mz}&=D\sin \omega t\end{aligned}\right\} \qquad (23)$$

Expanding equation (22) in terms of equations (23), we obtain the expression for the modulation flux in terms of the sinusoidal parameters. Therefore, $$\phi_x=[A\cos \omega t+B\cos \beta t+C\sin \beta t+D\sin \omega t]+\frac{1}{2!}[A\cos \omega t+B\cos \beta t+C\sin \beta t+D\sin \omega t]^2+\frac{1}{3!}[A\cos \omega t+B\cos \beta t+C\sin \beta t+D\sin \omega t]^3+\ldots \qquad (24)$$

If the coefficient of coupling, $k$, is made very small by including nonmagnetic material 3 as part of the core 2, the permeability $\mu$ of the magnetic material itself without considering gap and core length, is not used but rather the effective permeability, which is smaller than the permeability of the material itself, the relationship being, $$\mu_e=\frac{\mu}{1+\frac{a}{L_c}\mu} \qquad (25)$$

where, $a$, is the length of the nonmagnetic material 3 or the gap 10, and $L_c$ is the mean length of the core structure.

Typical curves for Selectron type cores made by Arnold Engineering Company indicate the relationship of magnetic material permeability with respect to effective permeability when effective air gap is included. The air gap may also be a nonmagnetic material filler. The curves show that if the ratio of $a/Lc=50\times10^{-4}$, magnetic material having a permeability range between 2,000 and 200,000 will have an effective permeability of 200. If $L_c$ is given as 3 centimeters, $a$, becomes 0.015 centimeters. Further reductions in effective permeability are possible with increase in the ratio of $a/Lc$. We shall keep in mind that in equations (17) through (34) the permeability is the effective permeability.

Expanding equation (24), we obtain, $$\phi_x=\left[\frac{A^2}{4}+\frac{B^2}{4}+\frac{C^2}{4}+\frac{D^2}{4}\right]$$
$$+\left[A+\frac{A^3}{8}+\frac{AB^2}{4}+\frac{AC^2}{4}+\frac{AD^2}{8}\right]\cos\omega t$$
$$+\left[D+\frac{D^3}{24}+\frac{A^2D}{8}+\frac{B^2D}{4}+\frac{C^2D}{4}\right]\sin\omega t$$
$$+\left[B+\frac{B^3}{8}+\frac{A^2B}{4}+\frac{BC^2}{8}+\frac{BD^2}{4}\right]\cos\beta t$$
$$+\left[C+\frac{C^3}{24}+\frac{CD^2}{4}+\frac{A^2C}{4}+\frac{B^2C}{8}\right]\sin\beta t$$
$$+\left[\frac{A^2}{4}-\frac{D^2}{4}\right]\cos 2\omega t+\left[\frac{AD}{2}\right]\sin 2\omega t$$
$$+\left[\frac{B^2}{4}-\frac{C^2}{4}\right]\cos 2\beta t+\left[\frac{BC}{2}\right]\sin 2\beta t$$
$$+\left[\frac{A^3}{24}-\frac{AD^2}{8}\right]\cos 3\omega t-\left[\frac{D^3}{24}-\frac{A^2D}{8}\right]\sin 3\omega t$$
$$+\left[\frac{B^3}{24}-\frac{BC^2}{8}\right]\cos 3\beta t-\left[\frac{C^3}{24}-\frac{B^2C}{8}\right]\sin 3\beta t$$
$$+\left[\frac{AB}{2}-\frac{CD}{2}+\frac{AB^2}{8}\right]\cos(\omega+\beta)t$$
$$+\left[\frac{AB}{2}+\frac{CD}{2}+\frac{AB^2}{8}\right]\cos(\omega-\beta)t$$
$$+\left[\frac{AC}{2}+\frac{BD}{2}\right]\sin(\omega+\beta)t-\left[\frac{AC}{2}-\frac{BD}{2}\right]\sin(\omega-\beta)t$$
$$+\left[\frac{AC^2}{8}-\frac{BCD}{4}\right]\cos(\omega+2\beta)t$$
$$-\left[\frac{AC^2}{8}-\frac{BCD}{4}\right]\cos(\omega-2\beta)t$$
$$+\left[\frac{B^2D}{8}-\frac{C^2D}{8}+\frac{ABC}{4}\right]\sin(\omega+2\beta)t$$
$$+\left[\frac{B^2D}{8}-\frac{C^2D}{8}+\frac{ABC}{4}\right]\sin(\omega-2\beta)t$$
$$+\left[\frac{A^2B}{8}-\frac{BD^2}{8}-\frac{ACD}{4}\right]\cos(2\omega+\beta)t$$
$$+\left[\frac{A^2B}{8}-\frac{BD^2}{8}+\frac{ACD}{4}\right]\cos(2\omega-\beta)t$$
$$+\left[\frac{A^2C}{8}-\frac{CD^2}{8}+\frac{ABD}{4}\right]\sin(2\omega+\beta)t$$
$$-\left[\frac{A^2C}{8}-\frac{CD^2}{8}-\frac{ABD}{4}\right]\sin(2\omega-\beta)t \qquad (26)$$

Selecting only the terms that have both the intelligence and carrier components since the intelligence in modulating the carrier is communicated thereby, and besides a tuned circuit which is tuned to the carrier will not accept an audio intelligence signal by itself, but will accept the carrier signal by itself which will be demodulated and filtered out from the intelligence output when so reproduced, equation (26) becomes:

$$\phi_x=\left[\frac{AB}{2}-\frac{CD}{2}+\frac{AB^2}{8}\right]\cos(\omega+\beta)t$$
$$+\left[\frac{AB}{2}+\frac{CD}{2}+\frac{AB^2}{8}\right]\cos(\omega-\beta)t$$
$$+\left[\frac{AC}{2}+\frac{BD}{2}\right]\sin(\omega+\beta)t-\left[\frac{AC}{2}-\frac{BD}{2}\right]\sin(\omega-\beta)t$$
$$-\left[\frac{AC^2}{8}-\frac{BCD}{4}\right]\cos(\omega+2\beta)t$$
$$-\left[\frac{AC^2}{8}-\frac{BCD}{4}\right]\cos(\omega-2\beta)t$$
$$+\left[\frac{B^2D}{8}-\frac{C^2D}{8}+\frac{ABC}{4}\right]\sin(\omega+2\beta)t$$
$$+\left[\frac{B^2D}{8}-\frac{C^2D}{8}-\frac{ABC}{4}\right]\sin(\omega-2\beta)t$$
$$+\left[\frac{A^2B}{8}-\frac{BD^2}{8}-\frac{ACD}{4}\right]\cos(2\omega+\beta)t$$
$$+\left[\frac{A^2B}{8}-\frac{BD^2}{8}\right]\cos(2\omega-\beta)t$$
$$+\left[\frac{A^2C}{8}-\frac{CD^2}{8}+\frac{ABD}{4}\right]\sin(2\omega+\beta)t$$
$$-\left[\frac{A^2C}{8}-\frac{CD^2}{8}-\frac{ABD}{4}\right]\sin(2\omega-\beta)t \qquad (27)$$

From the trigonometric identity of, $$\sin\alpha=\sqrt{(1-\cos 2\alpha)/2}$$

Equation (27) may be rewritten as follows:

| Equation Terms | Term Number |
|---|---|
| $\phi_x=$ | |
| $+\left[\frac{AB}{2}-\frac{CD}{2}+\frac{AB^2}{8}\right]\cos(\omega+\beta)t$ | (28.1) |
| $+\left[\frac{AB}{2}+\frac{CD}{2}+\frac{AB^2}{8}\right]\cos(\omega-\beta)t$ | (28.2) |
| $+\left[\frac{AC}{2}+\frac{BD}{2}\right]\sqrt{\frac{1-\cos(2\omega+2\beta)t}{2}}$ | (28.3) |
| $-\left[\frac{AC}{2}-\frac{BD}{2}\right]\sqrt{\frac{1-\cos(2\omega-2\beta)t}{2}}$ | (28.4) |
| $+\left[\frac{AC^2}{8}-\frac{BCD}{4}\right]\cos(\omega+2\beta)t$ | (28.5) |
| $-\left[\frac{AC^2}{8}-\frac{BCD}{4}\right]\cos(\omega-2\beta)t$ | (28.6) |
| $+\left[\frac{B^2D}{8}-\frac{C^2D}{8}+\frac{ABC}{4}\right]\sqrt{\frac{1-\cos(2\omega+4\beta)t}{2}}$ | (28.7) |
| $+\left[\frac{B^2D}{8}-\frac{C^2D}{8}-\frac{ABC}{4}\right]\sqrt{\frac{1-\cos(2\omega-4\beta)t}{2}}$ | (28.8) |
| $+\left[\frac{A^2B}{8}-\frac{BD^2}{8}-\frac{ACD}{4}\right]\cos(2\omega+\beta)t$ | (28.9) |
| $+\left[\frac{A^2B}{8}-\frac{BD^2}{8}+\frac{ACD}{4}\right]\cos(2\omega-\beta)t$ | (28.10) |
| $+\left[\frac{A^2C}{8}-\frac{CD^2}{8}+\frac{ABD}{4}\right]\sqrt{\frac{1-\cos(4\omega+2\beta)t}{2}}$ | (28.11) |
| $-\left[\frac{A^2C}{8}-\frac{CD^2}{8}-\frac{ABD}{4}\right]\sqrt{\frac{1-\cos(4\omega-2\beta)t}{2}}$ | (28.12) |

| Term Numbers of Equation (28) | Type of Components of Equation (28) |
|---|---|
| (28.1), (28.2) | desired fundamental component |
| (28.3), (28.4) | phase distortion of fundamental |
| (28.5), (28.6) | frequency distortion of the fundamental |
| (28.7), (28.8) | phase and frequency distortion of fundamental |
| tm (29) | |
| (28.9), (28.10) | second harmonic component |
| (28.11), (28.12) | phase distortion of second harmonic |

In (28) above, the terms without the radical are either the distortionless components or the frequency distortion components, and the terms under the radical are the phase and sometimes frequency distortion components, the sinusoidal expression thereof being the frequency distortion part and the radical itself being the cause of phase distortion. This may be verified by a simple plot of the function with a radical term added to an undistorted component which will show a phase shift with respect to the undistortered component and a shift of the combined undistortered component and a radical term into the positive region above the time axis accounting for the pure numerical term under the radical.

From equation (11), we obtain:

$$L_z = \frac{N_z^2 A_z \mu_e}{L_c}$$

$$L_w = \frac{N_w^2 A_w \mu_e}{L_c}$$

and the coefficients of (21), (23), (24), (26), (27) and (28) may be redefined as follows:

$$A = \frac{L_w V_1}{N_w Z_{(\omega)}}$$

$$B = \frac{L_z V_2}{N_z Z_{(\beta)}}$$

$$C = \frac{k^2 \beta L_w L_z V_2}{N_w Z_{(\omega)} Z_{(\beta)}}$$

$$D = \frac{k^2 \omega L_w L_z V_1}{N_z Z_{(\omega)} Z_{(\beta)}} \quad (30)$$

If we assume numerical values for some of the parameters of the coefficients which would be encountered in practice, then we will let, $V_1 = V_2 = 1$ volt $\qquad R_w = 100$ ohms
$L_w = L_z = 0.5$ henries $\qquad R_z = 50$ ohms
$N_w = N_z = 100$ turns and computing $\beta$, $\omega$, and $Z_{(\beta)}$ and $Z_{(\omega)}$ which are the angles in radians per second of the intelligence and carrier frequencies and the impedances of the intelligence and carrier inductances $L_z$ and $L_w$ respectively, we obtain, $$\beta|_{\text{at 10 c.p.s.}} = 62.8 \qquad Z_{(\beta)}|_{\text{at 10 c.p.s.}} = 59$$

$$\beta|_{\text{at 20 k.c. s.}} = 1.256 \times 10^5 \qquad Z_{(\beta)}|_{\text{at 20 k.c. s.}} = 6.28 \times 10^4$$

$$\omega|_{\text{at 50 k.c. s.}} = 3.14 \times 10^5 \qquad Z_{(\omega)}|_{\text{at 50 k.c. s.}} = 1.57 \times 10^5$$

Therefore, the coefficients evaluated in terms of $k$, become:

| coefficient | at 10 c.p.s. | at 20 k.c.p.s. |
|---|---|---|
| A | $3.18\times10^{-8}$ | $3.18\times10^{-8}$ |
| B | $8.48\times10^{-5}$ | $7.96\times10^{-8}$ |
| C | $1.69\times10^{-8}k^2$ | $3.18\times10^{-8}k^2$ |
| D | $8.48\times10^{-5}k^2$ | $7.96\times10^{-8}k^2$ |

and the specific values of the coefficients for different values of $k$, become:

| coefficient | $\beta$ at 10 c.p.s. $k=0.9$ | $\beta$ at 10 c.p.s. $k=0.1$ | $\beta$ at 20 k.c.p.s. $k=0.9$ | $\beta$ at 20 k.c.p.s. $k=0.1$ |
|---|---|---|---|---|
| A | $3.18\times10^{-8}$ | $3.18\times10^{-8}$ | $3.18\times10^{-8}$ | $3.18\times10^{-8}$ |
| B | $8.48\times10^{-5}$ | $8.48\times10^{-5}$ | $7.96\times10^{-8}$ | $7.96\times10^{-8}$ |
| C | $1.37\times10^{-8}$ | $1.69\times10^{-10}$ | $2.58\times10^{-8}$ | $3.1810^{-10}$ |
| D | $6.86\times10^{-5}$ | $8.48\times10^{-7}$ | $6.45\times10^{-8}$ | $7.96\times10^{-10}$ |

(31)

Evaluating the coefficient groups of terms of equation (28) for two different conditions of $\beta$ and $k$, we obtain:

| Term No. of (28) | Coefficient Group from Equation (28) | $\beta$ at 10 c.p.s. $k=0.9$ | $\beta$ at 10 c.p.s. $k=0.1$ | $\beta$ at 20 k.c. s. $k=0.9$ | $\beta$ at 20 k.c. s. $k=0.1$ |
|---|---|---|---|---|---|
| (28.1) | $+\left[\frac{AB}{2}-\frac{CD}{2}+\frac{AB^2}{8}\right]$ | $+.88\times10^{-12}$ | $+13.5\times10^{-12}$ | $+.44\times10^{-15}$ | $+1.27\times10^{-15}$ |
| (28.2) | $+\left[\frac{AB}{2}+\frac{CD}{2}+\frac{AB^2}{8}\right]$ | $+1.82\times10^{-12}$ | $+1.35\times10^{-12}$ | $+2.10\times10^{-15}$ | $+1.27\times10^{-15}$ |
| (28.3) | $+\left[\frac{AC}{2}+\frac{BD}{2}\right]$ | $+2.91\times10^{-9}$ | $+3.59\times10^{-11}$ | $+2.98\times10^{-15}$ | $+3.68\times10^{-17}$ |
| (28.4) | $-\left[\frac{AC}{2}-\frac{BD}{2}\right]$ | $+2.91\times10^{-9}$ | $+3.59\times10^{-11}$ | $+2.16\times10^{-15}$ | $+2.66\times10^{-17}$ |
| (28.5) | $+\left[\frac{AC^2}{8}-\frac{BCD}{4}\right]$ | $-1.99\times10^{-17}$ | $-3.04\times10^{-21}$ | $-3.58\times10^{-23}$ | $-5.44\times10^{-12}$ |
| (28.6) | $-\left[\frac{AC^2}{8}-\frac{BCD}{4}\right]$ | $+1.99\times10^{-17}$ | $+3.04\times10^{-21}$ | $+3.05\times10^{-23}$ | $+4.64\times10^{-27}$ |
| (28.7) | $+\left[\frac{B^2D}{8}-\frac{C^2D}{8}+\frac{ABC}{4}\right]$ | $+6.18\times10^{-14}$ | $+7.63\times10^{-16}$ | $+6.20\times10^{-23}$ | $+8.32\times10^{-25}$ |
| (28.8) | $+\left[\frac{B^2D}{8}-\frac{C^2D}{8}-\frac{ABC}{4}\right]$ | $+6.18\times10^{-14}$ | $+7.63\times10^{-16}$ | $+2.94\times10^{-23}$ | $+4.29\times10^{-25}$ |

| Term No. of (28) | Coefficient Group from Equation (28) | $\beta$ at 10 c.p.s. | | $\beta$ at 20 k.c. s. | |
|---|---|---|---|---|---|
| | | $k=0.9$ | $k=0.1$ | $k=0.9$ | $k=0.1$ |
| (28.9) | $+\left[\frac{A^2B}{8}-\frac{BD^2}{8}-\frac{ACD}{4}\right]$ | $-4.98\times10^{-14}$ | $-7.14\times10^{-18}$ | $-4.46\times10^{-23}$ | $+1.00\times10^{-23}$ |
| (28.10) | $+\left[\frac{A^2B}{8}-\frac{BD^2}{8}+\frac{ACD}{4}\right]$ | $-4.98\times10^{-14}$ | $-7.14\times10^{-18}$ | $-1.82\times10^{-23}$ | $+1.00\times10^{-23}$ |
| (28.11) | $+\left[\frac{A^2C}{8}-\frac{CD^2}{8}+\frac{ABD}{4}\right]$ | $+5.09\times10^{-17}$ | $+5.68\times10^{-19}$ | $+3.07\times10^{-23}$ | $+5.44\times10^{-25}$ |
| (28.12) | $-\left[\frac{A^2C}{8}-\frac{CD^2}{8}-\frac{ABD}{4}\right]$ | $+6.70\times10^{-17}$ | $+5.68\times10^{-19}$ | $+5.10\times10^{-23}$ | $+4.64\times10^{-25}$ |

Approximate magnitudes of the ratios of output flux of the several modulation components computed in table (32) taken for multiple magnetic discontinuities ($k$=0.1) with respect to single magnetic discontinuities ($k$=0.9) indicates the effectiveness of utilizing multiple magnetic discontinuities in the magnetic structures, and is as follows:

| Component Terms of Equation (28) | Type of Component | $\beta$ 10 c.p.s. | $\beta$ at 20 k.c.p.s. |
|---|---|---|---|
| (28.1), (28.2) | Desired Fundamental | 1 | 1 |
| (28.3), (28.4) | Phase Distortion of Fundamental | $10^{-2}$ | $10^{-2}$ |
| (28.5), (28.6) | Frequency Distortion of Fundamental | $10^{-4}$ | $10^{-4}$ |
| (28.7), (28.8) | Phase and Frequency Distortion of Fundamental | $10^{-8}$ | $10^{-9}$ |
| (28.9), (28.10) | Second Harmonic | $10^{-4}$ | 1 |
| (28.11), (28.12) | Phase Distortion of Second Harmonic | $10^{-2}$ | $10^{-8}$ |

(33)

Table (32) further shows that the fundamental carrier components (28.1), (28.2) have substantially higher outputs than the second harmonic components (28.9), (28.10), and shows that certain distortion components are attenuated about one-billion times over the fundamental components (28.1), (28.2). This table also shows high attenuation of all phase distortion components and phase and frequency distortion components to such low levels when multiple discontinuities in the core are used that these distortion components may be negleted when compared with the fundamental components (28.1), (28.2). Attenuation of the second harmonic is so large in multiple discontinuity cores and distortion components of the second harmonic are greater in magnitude than the second harmonic itself, that magnetic recording becomes only practical at the fundamental carrier frequency.

Table (33) also shows that only the fundamental carrier component is of practical use, inasmuch as all phase distortion components of the fundamental vanish, all phase and frequency distortion components vanish, there only remaining some frequency distortion components of the fundamental, but these components are down $10^5$ times over the fundamental carrier components (28.1), (28.2). Hence, superior advantages are gained in a core utilizing multiple magnetic discontinuities over single or no discontinuities. A system may of course be employed external to the magnetic component which rejects all carrier frequency components but the fundamental.

In addition to the large signal drop in the second harmonic as compared to the fundamental, there are also problems of heavy distortion of the phase and frequency types. In fact, phase and frequency distortion components of the second harmonic are higher than the fundamental or the second harmonic itself, and usage of the second harmonic should be avoided at all times irrespective if the cores have single or multiple discontinuities therein. The computations show that there are sufficient disadvantages due to distortion and low signal levels to rule out any carrier frequency but the fundamental in magnetic recording.

It is understood herein that when it is stated that a low coefficient of coupling such as 0.1 is used that its is intended to mean than this coefficient was established by virtue of the multiple magnetic discontinuities within the core structure and not in any other way.

Taking all the advantages of the multiple magnetic discontinuities in the core structure and the vanishing distortion components due to this type of structure, and using a tuned circuit within the amplifier connected to the magnetic component having this type of structure so as to discriminate against all but the fundamental carrier frequency, equation (28) reduces to:

$$\phi_r=\left[\frac{AB}{2}-\frac{CD}{2}\right]\cos(\omega+\beta)t+\left[\frac{AB}{2}+\frac{CD}{2}\right]\cos(\omega-\beta)t \quad (34)$$

which is simple the expression for the carrier fundamental frequency components bearing intelligence in a sideband-type expression, and not having any types of distortion components effective therein.

Also, the manner in which discontinuities are established may vary as follows: First, use of large nonmagnetic spacers between core portions bearing coils, or second, small nonmagnetic spacers with coil orientation in orthogonal plane relationship to reduce the mutual inductance between coils, or third, displacement of the longitudinal axes of the core portions with respect to each other so that the ends of the core portions either wholly or partially are not in cooperation with each other, but when wholly not cooperating, part of the side of one core portion cooperates with part of the side of another core portion, or fourth, any combination of the three methods stated above.

It should be realized that although discussion was in terms of magnetic heads, the application to magnetic logic elements is also important, as this principle of multiple core portions with discontinuities therebetween when applied to logic elements results in clean pulse outputs, minimizes transients and thereby increases the reliability of operation as well as reducing wave reconstitution components which might otherwise be needed in computer type circuits where normal components had to be used prior to this discovery. The subject of transient response will be treated hereinbelow.

It should also be realized that the flux components and current directions although shown in a given direction in the drawings, wherever input signals involve alternating currents, it is understood that all fluxes shown change their directions according to the alternation frequency.

TRANSIENT BEHAVIOR OF THE MAGNETIC ELEMENT

Figure 4:
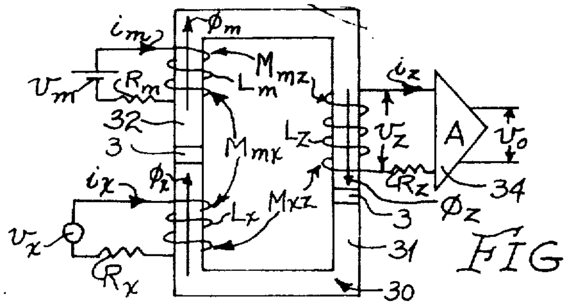
FIG. 4 is a schematic plan view of a magnetic logic NOT element wherein an amplifier at the output of this gate is normally biased by this NOT element so as to produce an output with no input pulse applied and to produce zero output with an input pulse applied.
Figure 5:
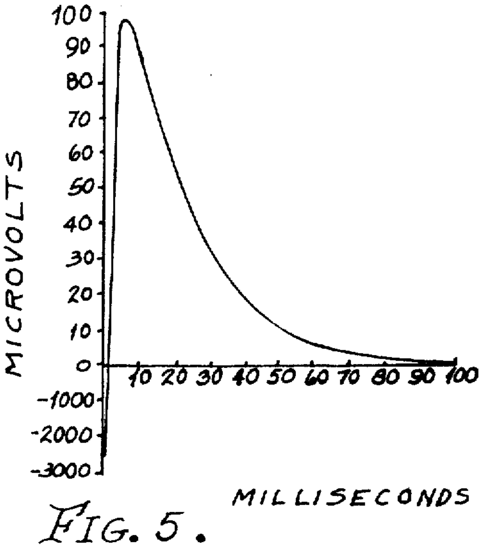
FIG. 5 is an output voltage response curve of the structure of FIG. 4 when the core structure thereof does not have core portions with multiple magnetic discontinuities.
Figure 6:
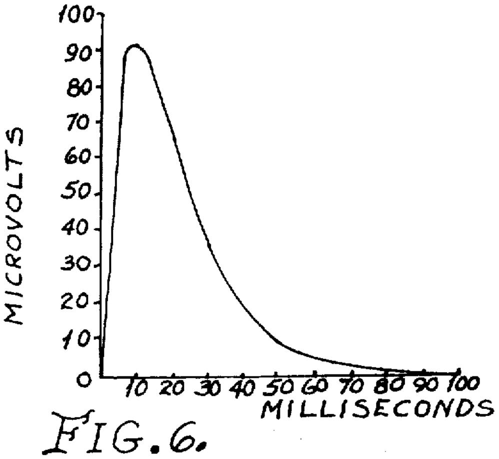
FIG. 6 is an output voltage response curve of structure of FIG. 4 except that the effect of introducing multiple discontinuities therein has been considered and showing the elimination of the large negative transient and wave shape improvement over the same core structure without these discontinuities.

Referring to FIGS. 4, 5 and 6 where a structure is used that could represent either a magnetic head or a magnetic logic element, it is significant to obtain the transient response so as to evaluate the effect of discontinuities in the magnetic core structure and their effect upon pulse fidelity. This structure has been chosen so that bias current can be provided as well as a single rectangular input pulse to obtain an electrical response in the output circuit having a coil terminated in a resistive load which is represented by lumped resistance $R_z$ which also accounts for the internal resistance of the amplifier connected to this coil. For the purpose of the computations $R_z$ will also represent the total resistance of the output circuit so that current through it can be computed. Choosing all values of inductance and resistance as in the Amplitude Modulation Analysis, where the inductances were equal to each other and the rectangular pulse input having a duration $\tau$, and expressed as, $$v_x = V_X\,[u(t) - u(t - \tau)] \qquad (35)$$

whose Laplace transform is, $$V_x\,[1 - e^{-\tau s}/s\,], \qquad (36)$$

and establishing the values of the parameters as follows:

$$V_x = 1 \text{ volt}$$
$$v_m = 1 \text{ volt}$$
$$R_x = R_z = 50 \text{ ohms} = R$$
$$R_m = 100 \text{ ohms}$$
$$\tau = 100 \text{ microseconds}$$
$$L_m = L_x = L_z = 0.5 \text{ henries} = L$$
$$M_{mx} = k\sqrt{L_m L_x}\,;\; M_{mz} = k\sqrt{L_m L_z}\,;\; M_{xz} = k\sqrt{L_x L_z}\,; \text{ and}$$
$$M_{mx} = M_{mz} = M_{xz} = kL = 0.5k = M$$

Further, there will be two conditions for the mutual inductance, in this application where these mutual inductances are all equal when the coefficient of coupling $k = 0.9$ (without multiple magnetic discontinuities) and when the coefficient of coupling $k = 0.1$ (with multiple magnetic discontinuities).

Due to the DC current $i_m$ flowing constantly, there is an initial voltage condition $L_m i_{mo}$ of the charged inductance $L_m$ which is included in the following set of equations written directly in Laplace transform notations. Inasmuch as this initial voltage will not affect the output voltage as it will eventually drop out in the calculation of the current $i_z$, it will be carried symbolically. Please note the the capitalized form of the currents is the Laplace transform equivalent of the lower case form notations. Therefore, $$\begin{aligned} -L_m i_{mo} &= (L_m s + R_m)\,I_m - MsI_x - MsI_z \\ 1 - e^{-\tau s}/s &= 0 + (Ls + R)\,I_x + MsI_z \\ 0 &= 0 + MsI_x + (Ls + R)\,I_z \end{aligned} \qquad (37)$$

It is noted here that the parameters where chosen so as to be compatible with the numbers used in the Modulation Distortion Analysis, above.

Using numerical values as established above, except in terms that will drop out anyway, we obtain the equations of (37) in the form of, $$\begin{aligned} -L_m i_{mo} &= (L_m s + R_m)\,I_m - 0.5ksI_x - 0.5ksI_z \\ 1 - e^{-10^{-4}s}/s &= 0 + (0.5s + 50) + 0.5ksI_z \\ 0 &= 0 + 0.5ksI_x + 0.5ksI_z \end{aligned} \qquad (38)$$

Solving for $I_z$ by determinants, we obtain:

$$I_z = \frac{\begin{vmatrix} +(L_m s + R_m) & -0.5ks & -L_m i_{mo} \\ 0 & +(0.5s+50) & \dfrac{1 - e^{-10^{-4}s}}{s} \\ 0 & +0.5ks & 0 \end{vmatrix}}{\begin{vmatrix} +(L_m s + R_m) & -0.5ks & -0.5ks \\ 0 & +(0.5s+50) & +0.5ks \\ 0 & +0.5ks & +(0.5s+50) \end{vmatrix}} \qquad (39)$$

$$= \frac{-(L_m s + R_m)(.5ks)\left(\dfrac{1 - e^{-10^{-4}s}}{s}\right)}{(L_m s + R_m)\,[(.5s+50)^2 - .25k^2s^2]} \qquad (40)$$

$$= \frac{-.5k + .5ke^{-10^{-4}s}}{(.5s+50)^2 - .25k^2s^2} \qquad (41)$$

A set of equations will be written symbolically using FIG. 2 as a basis, except that $v_{cw}$ will be replaced by the input rectangular pulse of unit amplitude represented by the transform (36), where $V_x = 1$, and the solution of the current in the load determined in terms of Laplace transform notations, and using the same values of inductance and resistance as used in conjunction with the equations for FIG. 4. The difference being that only two inductances will be available, hence what will be shown here that the solutions are identical even if the DC bias coil is not considered, thereby showing the applicability of this analysis to the magnetic heads. Remembering that the resistance of each coil circuit is still 50 ohms and the inductance of each coil still 0.5 henries, and that the mutual inductance will therefore be still $k\sqrt{L_w L_z} = 0.5k$, we obtain, $$\begin{aligned} \frac{1 - e^{-10^{-4}s}}{s} &= (.5s+50)I_w + .5ksI_z \\ 0 &= .5ksI_w + (.5s+50)I_z \end{aligned} \qquad (42)$$

and solving for $I_z$, we obtain $$I_z = \frac{\begin{vmatrix} (.5s+50) & \dfrac{1 - e^{-10^{-4}s}}{s} \\ .5ks & 0 \end{vmatrix}}{\begin{vmatrix} (.5s+50) & .5ks \\ .5ks & (.5s+50) \end{vmatrix}} \qquad (43)$$

$$= \frac{-(.5ks)\left(\dfrac{1 - e^{-10^{-4}s}}{s}\right)}{(.5s+50)^2 - .25k^2s^2} \qquad (44)$$

$$= \frac{-.5k + .5ke^{-10^{-4}s}}{(.5s+50)^2 - .25k^2s^2} \qquad (45)$$

Equation (45) is identical to equation (41) showing that the solutions are applicable for both heads and logic elements, and both have the same electrical response characteristics when subjected to a pulse or for that matter any forcing function, for the characteristics are dependent upon the denominator which is independent of forcing functions. It should be noted that in this analysis the currents selected and the core material used are assumed will not result in core saturation, for in saturating the core wave clipping would result, whereas in this analysis it is necessary to determine the pulse shapes resulting under non-saturating conditions so that the output pulse of the cases with multiple magnetic discontinuities and with only one discontinuity may be compared.

Evaluating the case where $k = 0.9$ (no multiple magnetic discontinuities), and substituting $k = 0.9$ in equation (41), we obtain, $$I_z = \frac{-.45 + .45e^{-10^{-4}s}}{.0475s^2 + 50s + 2500} \qquad (46)$$

$$= \frac{-.45+.45e^{-10^{-4}s}}{(s+52.6)(s+1000)} \quad (47)$$

$$i_z=\alpha^{-1}I_z=\frac{1}{2\pi j}\int_{-j\infty}^{+j\infty} I_z e^{st}ds=\sum_{s=-52.6,\,-1000} \text{Residues at poles} \quad (48)$$

Taking residues:

$$\frac{-.45+.45e^{-10^{-4}s}}{(s+52.6)(s+1000)}e^{st}=\frac{F}{s+52.6}+\frac{G}{s+1000} \quad (49)$$

from which, $$F=3\times10^{-6}e^{-52.6t}$$
$$G=-50\times10^{-6}e^{-1000t} \quad (50)$$

Therefore, $\Sigma$ residues $=F+G$; and $$i_z=3\times10^{-6}e^{-52.6t}-50\times10^{-6}e^{-1000t} \text{ amperes} \quad (51)$$

$$v_z=i_zR_z=150\times10^{-6}e^{-52.5t}-2500\times10^{-6}e^{-1000t} \text{ volts} \quad (52)$$

Evaluating the case where $k=0.1$ (with multiple magnetic discontinuities), and substituting $k=0.1$ in equation (41), we obtain, $$I_z=\frac{-.05+.05e^{-10^{-4}s}}{.2475s^2+50s+2500} \quad (53)$$

$$=\frac{-.05+.05e^{-10^{-4}s}}{(s+100.91)(s+101.11)} \quad (54)$$

$$i_z=\alpha^{-1}I_z=\frac{1}{2\pi j}\int_{-j\infty}^{+j\infty} I_z e^{st}ds=\sum_{s=-100.91,\,-101.11} \text{Residues at poles} \quad (55)$$

Taking residues:

$$\frac{-.05+.05e^{-10^{-4}s}}{(s+100.91)(s+101.11)}e^{st}=\frac{F}{(s+100.91)}+\frac{G}{(s+101.11)} \quad (56)$$

from which, $$F=2.5\times10^{-3}e^{-100.91t}$$
$$G=-2.5\times10^{-3}e^{-101.11t} \quad (57)$$

Therefore, $\sum$ Residues $=F+G$; and $$i_z=2.5\times10^{-3}e^{-100.91t}-2.5\times10^{-3}e^{-101.11t} \text{ amperes} \quad (58)$$

$$v_z=i_zR_z=125\times10^{-3}e^{-100.91t}-125\times10^{-3}e^{-101.11t} \text{ volts} \quad (59)$$

Evaluating equations (52) and (59) by using at least an eight place exponential table, we obtain the plot points for the graphs of FIGS. 5 and 6 respectively for the conditions $k=0.9$ and $k=0.1$:

(60)

| time in milliseconds | $v_z$ in microvolts $k$=0.9 | $v_z$ in microvolts $k$=0.1 |
|---|---|---|
| 0 | −2,350.00 | 0 |
| 5 | 98.47 | 75.43 |
| 10 | 88.53 | 91.05 |
| 15 | 68.14 | 82.42 |
| 20 | 52.39 | 66.31 |
| 25 | 40.27 | 50.02 |
| 30 | 30.96 | 36.23 |
| 35 | 23.80 | 25.51 |
| 40 | 18.30 | 17.59 |
| 45 | 14.06 | 11.94 |
| 50 | 10.81 | 8.01 |
| 55 | 8.31 | 5.32 |
| 60 | 6.39 | 3.50 |
| 65 | 4.91 | 2.29 |
| 70 | 3.78 | 1.49 |
| 75 | 2.90 | 0.96 |
| 80 | 2.23 | 0.62 |
| 85 | 1.72 | 0.40 |
| 90 | 1.32 | 0.25 |
| 95 | 1.01 | 0.16 |
| 100 | 0.78 | 0.10 |

Analysis of the curves of FIGS. 5 and 6 shows that by the presence of multiple magnetic discontinuities in the core structure of FIG. 4 that the electrical response characteristics and the pulse fidelity are substantially improved. It is pointed out that the FIG. 6 condition represents a higher fidelity and better pulse than the FIG. 5 condition, since it is broader in width and of better shape. The maximum pulse output amplitudes are not substantially different in the desired pulse output polarity (positive pulse shown), but it is pointed out that the negative excursion of the pulse of FIG. 5 is very objectionable in that its transient in the negative direction is about 23.5 times the peak amplitude of the positive pulse. This is quite bad in that the logic gates must have additional discriminating means against this large negative pulse, and when the element is utilized as a ternary logic gate the positive and negative pulses at the same time would confuse the logic making it impossible to function. When referring to magnetic head applications for both high fidelity recordings and computer applications, it is quite obvious that if the pulse input is in one direction (in this instance positive), a pulse output having both positive and negative components would contribute to distortion and loss of wave shape fidelity.

It is now obvious based upon the transient response which further substantiates the modulation analysis, that tremendous superiority in product performance is obtained by the introduction of multiple discontinuities in the magnetic core structures to be hereinbelow described as well as for magnetic recording and reproduction type cores. Care should also be exercised in choosing a balance of the parameters of inductance, resistance and mutual inductance so that the characteristic (denominator) of the current equation does not exhibit pairs of complex roots which is indicative of natural oscillation to be expected in the output when the magnetic element is energized by a pulse, step function or a sinusoidal variation impressed across one of its input coils.

It is also obvious from the above discussions pertaining to modulation effects and to transient response that the magnetic record or reproduce head with multiple magnetic core discontinuities is capable of packing pulses or confining broad bands of information or intelligence frequency spectra on small magnetic surface areas as compared with a head not having these multiple discontinuities, the reason therefor being that more recording surface is made available for recording with essentially freedom from the distortion components that otherwise occupy a major portion of recording surface and hence the industry has been, up to the time of this discovery, compelled to run recording area with respect to the head or visa versa at high speed in order to provide the additional recording surface as a substitute for the recording surface wasted by the presence of distortion components. It is therefore concluded that in reality there is no such thing as a natural rate of change head, for all heads are normally flux responsive, except that without multiple core discontinuities these heads are compelled to record or reproduce the generated distortion components inherent in modulation and which are now eliminated by application of this discovery. Similar principles would apply to logic circuits insofar as providing distortionless output to recording surface areas for storage of information and for retrieving same at a later time. Of course, a head-logic element wherein the recording or reproducing head is combined with a logic element as described in this disclosure, below, for recording or reproducing distortion-free information to or from a recording surface, in which case there would be motion of this combination head-logic element with respect to the recording surface area or visa versa with the same beneficial results.

FLUX RESPONSIVE DISTORTIONLESS MAGNETIC RECORD HEAD

Referring to FIGS. 1 and 2 and particularly to the modulation theory hereinabove developed wherein the record head was used as a model for this theoretical development, it is seen that the record head has winding $L_w$ wound on core member 7 of magnetic core structure 2, the core structure having nonmagnetic spacer 3 separating core member 7 from core member 8 and air gap 10 formed by members 7 and 8. Gap 10 may also have a nonmagnetic spacer therein or nonmagnetic insulating material. Member 8 has coil $L_z$ wound thereon. Coil $L_w$ is electrically connected to a carrier frequency source having a voltage output $v_{cw}$ of approximately 50 kilocycles which produces current $i_w$ in coil $L_w$, thus producing flux $\phi_w$ in core structure 2 in the direction indicated by the arrow at any one period of time. Coil $L_z$ has electrically connected thereto output of amplifier 1, with microphone 6 electrically connected to the input to amplifier 1, thus by virtue of voice or music impressed upon microphone 6, amplifier 1 puts out voltage $v_{cz}$ which produces current $i_z$ in coil $L_z$ thereby producing flux $\phi_z$ in core structure 2 in the direction indicated by the arrow showing the flux $\phi_z$; of course any signal source could have been connected instead of the microphone with the same results. Gap 10 is contiguous to or in contact with magnetizeable surface 9, which could be a tape or a record surface of any magnetic type, and the flux $\phi_z$ modulating flux $\phi_w$ is superimposed upon the surface 9 as flux $\phi_x$, the direction arrow thereof indicating the instantaneous direction of this modulated flux; this flux $\phi_x$ is the same flux $\phi_x$ as developed in the modulation theory section. As discussed in the theory section, there are undesireable mutual flux components caused by interaction of the fluxes $\phi_z$ and $\phi_w$ through the medium of mutual inductances between coils $L_w$ and $L_z$ and these mutual flux components are substantially reduced by virtue of having spacer 3. It will be recalled that in a conventional head no such additional nonmagnetic spacer is used. Also as mentioned in the theory section, the members 7 and 8 may be additionally skewed with respect to each other at the junction of spacer 3 so that the core portions would be out of alignment. This will further operate to decrease the undesired mutual flux components or the coils $L_w$ and $L_z$ may be wound so their planes are at right angles to each other also helping reduce mutual flux components. This last method becomes less practical as the number of windings are increased, for instance in usage as logic gates. It is therefore seen that except for the distortion components, eliminated by virtue of distortion minimizing techniques described above that there will be other combinations as indicated in the theory section, above. In fact the theory shows that the response will be a function of amplitude of the flux. The need for high tape speed with respect to the head or visa versa, in order to produce high fidelity recordings is due to the fact that the major portion of the recording space is overcrowded with undesired distortion components produced by the conventional type head. Were it not for these distortion components, the head would be flux responsive and not require the high speed movement of medium with respect to head or visa versa. This criterial will apply equally to the reproduce head, and the overall concept of distortion components apply equally to all other magnetic components described in this disclosure.

FLUX RESPONSIVE DISTORTIONLESS REPRODUCE MAGNETIC HEAD

Figure 3:
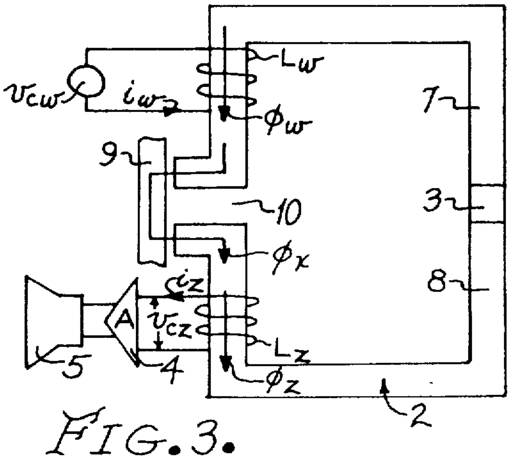
FIG. 3 is a schematic plan view of a magnetic flux responsive reproduce head.

Referring to FIGS. 1 and 3, and to the modulation theory hereinabove discussed as well as to the discussion of the record head, it can be seen that the reproduce head is actually of the same structure as the record head. Hence, the head may be used interchangeably between recording and reproducing functions. The core structure thereof and the windings thereon are the same as in the record head. The carrier signal is the same, however in certain applications the carrier signal may be omitted. Here flux $\phi_x$ from the recording medium 9 may be used to combine with carrier flux $\phi_w$ as provided by signal $v_{cw}$, but also this flux $\phi_w$ is already combined in the recording medium 9 to give the flux $\phi_x$ and the various components thereof for providing flux components $\phi_z$ in the output coil $L_z$, thereby producing current $i_z$ in, and a voltage $v_{cz}$ across the input to amplifier-demodulator 4, the output thereof being electrically connected to loud speaker 5 for reproduction of intelligence which had been previously superimposed on surface 9 of the recording medium. The amplifier-demodulator will reject pure carrier signals. Since the modulation signals will now be combinations of fundamental and intelligence or other combinations with highly attenuated distortion components, the tuned circuit within amplifier-demodulator 4 will accept only the fundamental with its intelligence, the fundamental carrier being demodulated and filtered so that only the intelligence without distortion remains, per theoretical development. It should also be remembered that the carrier frequency need be only high enough to accommodate the highest band width required. The amplifiers for both the reproduce and record heads will have to be responsive to input currents from both directions due to reversal in fluxes that will be exhibited in any sinusoidal or complex wave form. This is easily accomplished by a balanced type of amplifier input circuit if desired, or other types of circuitry may be used to obtain this result.

ANALOGY BETWEEN MAGNETIC HEADS AND LOGIC GATE STRUCTURES

If the logic gates are of the magnetic types there is a remarkable analogy as well as structural and functional likeness of the gates to the heads, in that in all cases the magnetic core with a magnetic flux circulating therein combines with another flux making excursions from one biasing point of the $\phi$-H curve to another, and causing a voltage to be induced in the output coil. In both heads and gates it is desireable to minimize mutual flux components in the core structures thereof.

DISTORTIONLESS MAGNETIC BINARY LOGIC NOT ELEMENT

Referring to FIGS. 1 and 20, magnetic core structure 30 is comprised of core portions 31 and 32. Core portion 32 has wound thereon bias coil $L_m$ which is electrically connected to a DC source having a voltage output $v_m$ which provides current $i_m$ in the coil for producing flux $\phi_m$ in core structure 30. Core portion 31 has wound thereon coil $L_x$ which is electrically connected to a pulse source having an output pulse $v_x$ which provides current $i_x$ in this coil for producing flux $\phi_x$. Core portion 32 also has wound thereon coil $L_z$ which is electrically connected to amplifier 34 which is responsive to voltage $v_z$, the output of coil $L_z$ due to current $i_z$ flowing therein and and produced by flux $\phi_z$ in magnetic core structure 30 which in turn is produced by virtue of flux $\phi_m$ when voltage $v_x$=0 at input to coil $L_x$, holding the operating point of the gate at point $D$ of the hysterysis loop, and in view of the fact that this bias allows apparatus 34 to normally produce an output signal $v_o$. However, during the duration of input pulse $v_x$, flux $\phi_x$ thereby produced will add to the flux $\phi_m$ thereby shifting operating point $D$ on the hysterysis loop to point $A$ and cutting off output $v_o$ from amplifier 34 for a similar duration of time. When the duration of pulse $v_x$ is complete, $i_x$ goes to zero and hence $\phi_x$ goes to zero and the operating point on the hysterysis loop is restored to point $D$ thereby allowing amplifier 34 to produce output $v_o$. The change in bias point or the hysterysis loop so as to convert a finite output to a zero output changes the state to a state opposite to its normal state, and in a binary logic sense this type of an element is called a NOT gate, and is used where inhibit action is desired. This logic element can also provide a negative output pulse by reversing the direction of the winding $L_x$ thereby changing the direction of flux $\phi_x$ which opposes $\phi_m$ and shifts from point $D$ to point $E$ thereby reversing the polarity of the output $v_o$. This is considered a NOT type action since it provides some other output than the normal output when no input pulse to this element is available.

In general the binary logic element of the NOT type may be used in combination with a binary AND or a binary OR gate to convert to either a binary NAND or NOR type binary gates respectively, or to convert the binary AND/OR or VOTING gates to binary NAND/NOR or NOT VOTING gates, obtaining opposite effects from these gates.

GENERAL CONSIDERATIONS

Distortion of the output signal consisting essentially of phase and frequency distortion and undesirable transients are basically caused by the presence of mutual magnetic flux components in a magnetizable core structure caused by interaction of a carrier flux with a flux bearing intelligence. Minimization of these mutual flux components is therefore very desirable. This is accomplished in all of the configurations described hereinabove by providing discontinuities in the magnetic core structure. Discontinuities may be provided by injecting nonmagnetic separators in between the several core portions that comprise the core structure, or by skewing or misalignment of these core portions so that the ends thereof do do not abut each other exactly but rather part of the sides thereof are layed over each other in such a way so as to have the ends clearly visible, or the ends of the core portions partly abut each other, or the ends partly abut each other with nonmagnetic separators at the juncture of these ends, or any combination of nonmagnetic separators, skewing, core misalignment so as to result in reduction in said mutual flux components due to introduction of the various discontinuities in the magnetic core structure which in effect minimizes phase and frequency distortion, increases the fidelity of pulse and wave shape, eliminates objectionable transients of electrical polarity opposite to the electrical polarity of the desired output signal, increases the band width characteristics of the several magnetic components described hereinabove, and provides a better magnetic record or reproduce head and better magnetic logic components of the binary or ternary types.

Hence, in view of the foregoing, a magnetic record head, a magnetic reproduce head, and magnetic logic devices have the common characteristics stated broadly as, a magnetic means for providing virtually distortionless output, comprising a magnetizable core structure comprising a plural number of core portions having coil means thereon and having a first main core flux and a second main core flux interacting within the core structure thereby producing mutual flux components due to this interaction, and the magnetizable core structure has multiple magnetic discontinuities where at least one of the discontinuities is provided at a junction of any two of the core portions, the discontinuities producing attenuation of the mutual flux components thereby providing virtually distortionless output of the magnetic means.

Further, and referring particularly to FIG. 2, and in addition to the common characteristics stated above, the magnetic record head is a flux responsive head. One of the coil means is a first coil means retained by a first of the core portions responsive to a carrier signal for producing the first main core flux which is a carrier flux circulating within the magnetizeable core structure. Another of the coil means is a second coil means retained by a second of the core portions responsive to an electrical signal for producing the second main core flux which is a signal bearing flux, thereby producing a modulated carrier flux. Additionally, at least one pair of the plural number of core portions with at least one of the multiple magnetic discontinuities form a gap which is adapted for communicating the modulated carrier flux from the magnetizable core structure to an external recording medium for recording the modulated carrier flux thereon.

Further, and referring particularly to FIG. 3, and in addition to the common characteristics stated above, the magnetic reproduce head is a flux responsive head. At least one pair of the plural number of core portions with at least one of the multiple magnetic discontinuities for a gap adapted for sensing the first main core flux which is modulated by intelligence constituting the second main core flux, already recorded on a magnetic recording medium. The coil means is a coil which is responsive to the intelligence modulated flux used for communicating the intelligence modulated flux so as to enable demodulation thereof and reproduction of the intelligence by external circuitry. The coil means may optionally comprise an additional coil retained by one of the core portions and connected to a carrier signal for mixing with the recorded modulated intelligence, and the intelligence modulating this signal, in which case the additional carrier signal would consist of a portion of the first main core flux and demodulation thereof along with the modulated intelligence would be accomplished by the external circuitry. The double modulation may have certain advantages in providing analogous circuitry for both recording and reproducing functions.

ALTERNATE EXEMPLARY EMBODIMENTS OF THE DISTORTIONLESS MAGNETIC HEAD

Referring to FIG. 7, a hair pin type magnetic record head is provided wherein a magnetic core 40 also acts as the inductance through which intelligence signals are conducted. Core 40 has multiple magnetic discontinuities 41 therein which may be segmentary portions of nonmagnetic material such as copper welded to the core segments or may simply be plastic insulating material attached between the core segments by epoxy. Recording gap 42 in the core structure may be an air gap or electrical insulation material attached to the core. Insulated wire 43 is wound on both legs of the core with a wire therein having ends 44 and 45 to which the carrier or bias signal is connected. Since the hair pin material is magnetic, it serves as a magnetic core for the carrier flux as well as for the flux bearing intelligence signals. Consequently, when an intelligence signal is connected across ends 46 and 47, magnetic flux is provided in the core. Similarly, when a carrier signal is applied across wire ends 44 and 45 a carrier flux is provided in the core. The resultant flux due to carrier and intelligence combined in accordance with the theoretical treatment provided above, is shown at 48. The multiple discontinuities in member 40 provides the phase, frequency and negative transient minimization as hereinabove described. The carrier signal may be applied to terminals 46 and 47 and the intelligence signal to terminals 44 and 45 if desired. The head when used without winding 43 may be used as a reproduce head.

Referring to FIG. 8, a hair pin type of magnetic record head is provided wherein a magnetic core 50 also acts as the inductance to which intelligence signals are applied. Core 50 has multiple magnetic discontinuities 51 therein which may be segmentary portions of nonmagnetic material such as copper welded to the core segments, or may be simply plastic electrically insulating material attached between the core segments by epoxy. Recording gap 52 in the core structure may be an air gap or electrical insulation material attached to the core. Insulating sleeve 53 is positioned over one of the core segments and a winding defined by its ends 54 and 55 is wound over the insulating sleeve. A carrier or bias signal is connected to terminals 54 and 55. Since the hair pin material is magnetic it serves as a magnetic core as well as the inductance for providing the intelligence flux in this material or core. The intelligence flux is provided by connecting an intelligence-bearing signal across terminals 57 and 58 of the hair pin core. The combined intelligence and carrier fluxes are denoted by arrow 59 in the core structure. The combined flux results in accordance with the theoretical treatment given above. The multiple discontinuities in member 50 provide the phase, frequency and negative transient minimization as hereinabove described. The carrier signal may be applied to terminals 57 and 58, and the intelligence signals to terminals 54 and 55 if desired. The head when used without the winding denoted by terminals 54 and 55 may be used as a reproduce head.

Referring to FIG. 9, a hair pin type of magnetic record head is provided wherein a magnetic core 60 also acts as the inductance through which intelligence signals are conducted. Core 60 has multiple magnetic discontinuities provided by segmenting the core into segments 61, 62, 63, 64, 65 and 66. Recording gap is provided at 67 which may be an air gap or have nonmagnetic insulating material such as a plastic thereat, attaching core segments 63 and 64 to the plastic material. The remaining core segments are attached to each other in a manner where the side of one segment is attached to the side of another segment, the ends of the segments not abutting each other. This mode of core segment connection is an alternate way of achieving multiple magnetic discontinuities in the magnetic flux path of the core structure. An insulating sleeve 68 is provided over one of the segments of the core, over which is wound a coil denoted by terminals 70 and 71. This coil has connected thereto a carrier or bias signal and provides the carrier flux in the core. A voltage bearing intelligence is connected across ends 72 and 73 of the core for providing the intelligence flux therein. The combined intelligence and carrier flux is denoted by arrow 74. This combined flux results in accordance with the theoretical treatment given above. The multiple magnetic discontinuities in member 60 provides the phase, frequency and negative transient minimizing action as hereinabove described. The carrier signal may be applied to terminals 72 and 73, and the intelligence signal to terminals 70 and 71 if desired. The head when used without the winding described by terminals 70 and 71 may be used as a reproduce head.

I claim:

1. A magnetic device for achieving electrical signals with attenuation of distortion components, comprising in combination:

a magnetizable core structure for conducting magnetic flux therein comprising a plural number of core portions with magnetic discontinuities in the core structure as between any two said core portions; and coil means wound on the core portions responsive to electrical signals imposed thereon or to magnetic flux within the core structure, an individual core portion allocated for each coil of the coil means, said discontinuities defining locations at the core structure and effecting a finite coefficient of coupling of a magnitude of less than 0.9 between any two coils of said coil means for attenuating mutual flux components residual in the magnetic flux thereby providing distortion reduction in said device.

2. A magnetic main core flux responsive head for producing intelligence with attenuation of distortion components, comprising in combination:

a magnetizable core structure comprising a plural number of core portions and a multiplicity of magnetic discontinuities, a discontinuity provided between any two of said core portions, at least one of the discontinuities constituting gap means for communication of flux external said head; and at least one coil wound on one of the core portions responsive to an intelligence signal for producing a first main core flux in the core structure and at least another coil wound on another of the core portions responsive to a carrier signal for producing a second main core flux in the core structure, the first and second main core flux interacting in the core structure and producing a modulated flux containing intelligence and mutual flux components, said discontinuities defining locations at the core structure and effecting a finite coefficient of coupling of a magnitude of less than 0.9 between said at least one coil and said at least another coil for attenuating said mutual flux components thereby providing communication of the modulated flux with said intelligence via said gap means virtually devoid of said mutual flux components and consequently a reduction of distortion in said intelligence.

3. A magnetic main core flux responsive head for reproducing intelligence with attenuation of distortion components, comprising in combination:

a magnetizable core structure comprising a plural number of core portions and a multiplicity of magnetic discontinuities, any two of said core portions providing a discontinuity therebetween, at least one of the discontinuities constituting gap means for communication of magnetic flux to said head, which magnetic flux comprises intelligence and mutual flux components; and at least two coils, each of the coils wound on an individual core portion of the core structure, for communicating said intelligence from said head, said discontinuities defining locations at the core structure and effecting a finite coefficient of coupling of a magnitude of less than 0.9 between any two coils of said at least two coils for attenuating the mutual flux components thereby reproducing said intelligence with consequential reduction of distortion.

4. The invention as stated in claim 3, wherein:

said magnetizable core structure also functions as the means for communicating said intelligence.

5. The invention as stated in claim 3:

said at least two coils being a plurality of coils constituting more than two coils wound on the core portions, each of the plurality of coils being wound on an individual portion of the plural number of core portions.

6. The invention as stated in claim 3:

said core portions being attached at the sides thereof to each other in misalignment of the ends thereof except for such of said ends forming said gap means which are in substantial alignment.

7. A magnetic main core flux responsive head for producing intelligence with attenuation of distortion components, comprising in combination:

a magnetizable core structure comprising a plural number of core portions and a multiplicity of magnetic discontinuities, a discontinuity provided between any two of said core portions, at least one of the discontinuities constituting gap means for communication of flux external said head, said core structure also acting as a coil responsive to an intelligence signal imposed thereon for producing a first main core flux therein; and a coil being wound on an individual core portion of the core structure responsive to a carrier signal for producing a second main core flux in the core structure, the first and second main core flux interacting in the core structure and producing a modulated flux containing intelligence and mutual flux components, said discontinuities defining locations at the core structure and effecting a finite coefficient of coupling of a magnitude of less than 0.9 between said coil and core structure for attenuating said mutual flux components thereby providing communication of the modulated flux with said intelligence via said gap means virtually devoid of said mutual flux components with consequential reduction of distortion.

8. The intention as stated in claim 7:

the core portions being attached to each other in misalignment of the ends thereof providing at least one of the discontinuities thereat except for such of said ends forming said gap means which are in substantial alignment and providing another one of the discontinuities.

9. A magnetic head core structure, comprising:

a plural number of core portions and having magnetic discontinuities between any two of said core portions, said core structure also acting as an inductance means for sensing an electrical signal or a magnetic flux, said discontinuities defining locations at the core structure and effecting a finite coefficient of coupling of a magnitude of less than 0.9 between any of the core portions and said inductance means for attenuation of mutual flux components in said core structure.

* * * * *

PO-1050
(5/69)

UNITED STATES PATENT OFFICE
CERTIFICATE OF CORRECTION

Patent No. 3,651,282 Dated March 21, 1972

Inventor(s) Martin E. Gerry Page 1 of 5 pages

It is certified that error appears in the above-identified patent and that said Letters Patent are hereby corrected as shown below:

Claim 8, Column 22, line 56, should read:

8. The invention as stated in claim 7:

Column 7, line 39, should read:

$$+\left[-\frac{AC^2}{8}-\frac{BCD}{4}\right]\cos(\omega+2\beta)t$$

Column 7, line 47, should read:

$$+\left[\frac{B^2D}{8}-\frac{C^2D}{8}-\frac{ABC}{4}\right]\sin(\omega-2\beta)t$$

Column 8, line 5, should read:

$$+\left[-\frac{AC^2}{8}-\frac{BCD}{4}\right]\cos(\omega+2\beta)t$$

Column 8, line 18, should read:

$$+\left[\frac{A^2B}{8}-\frac{BD^2}{8}+\frac{ACD}{4}\right]\cos(2\omega-\beta)t$$

Column 8, line 49, Equation Term (28.5), should read:

$$+\left[-\frac{AC^2}{8}-\frac{BCD}{4}\right]\cos(\omega+2\beta)t$$

Column 9, line 9, delete the following:

tm (29)

PO-1050
(5/69)

UNITED STATES PATENT OFFICE
CERTIFICATE OF CORRECTION

Patent No. 3,651,282 Dated March 21, 1972

Inventor(s) Martin E. Gerry

It is certified that error appears in the above-identified patent and that said Letters Patent are hereby corrected as shown below:

Tables at Column 10, lines 23-30 and lines 35-43 should read respectively:

| Coefficient | at 10 c.p.s | at 20 k.c.p.s. |
|---|---|---|
| A | $3.18 \times 10^{-8}$ | $3.18 \times 10^{-8}$ |
| B | $8.48 \times 10^{-5}$ | $7.96 \times 10^{-8}$ |
| C | $1.69 \times 10^{-8} k^2$ | $3.18 \times 10^{-8} k^2$ |
| D | $8.48 \times 10^{-5} k^2$ | $7.96 \times 10^{-8} k^2$ |

| | at 10 c.p.s | | at 20 k.c.p.s | |
|---|---|---|---|---|
| Coefficient | k = 0.9 | k = 0.1 | k = 0.9 | k = 0.1 |
| A | $3.18 \times 10^{-8}$ | $3.18 \times 10^{-8}$ | $3.18 \times 10^{-8}$ | $3.18 \times 10^{-8}$ |
| B | $8.48 \times 10^{-5}$ | $8.48 \times 10^{-5}$ | $7.96 \times 10^{-8}$ | $7.96 \times 10^{-8}$ (31) |
| C | $1.37 \times 10^{-8}$ | $1.69 \times 10^{-10}$ | $2.58 \times 10^{-8}$ | $3.18 \times 10^{-10}$ |
| D | $6.86 \times 10^{-5}$ | $8.48 \times 10^{-7}$ | $6.45 \times 10^{-8}$ | $7.96 \times 10^{-10}$ |

PO-1050
(5/69)

UNITED STATES PATENT OFFICE
CERTIFICATE OF CORRECTION

Patent No. 3,651,282 Dated March 21, 1972

Inventor(s) Martin E. Gerry

It is certified that error appears in the above-identified patent and that said Letters Patent are hereby corrected as shown below:

Table at bottom of Columns 9 and 10:

This table should be identified as "(32)", near the right margin thereof

In term (28.5), under the caption of Coefficient Group from Equation (28), that group should read:

$$+\left[-\frac{AC^2}{8}-\frac{BCD}{4}\right]$$

under caption of $\beta$ at 20 k.c.s. for k = 0.1, the value should read:

$$-5.44 \times 10^{-27}$$

Column 13, line 33, expression (36), should read:

$$V_x\left[\frac{1-e^{-\tau s}}{s}\right]$$

Column 13, line 59, the middle equation of set (37) should read:

$$\frac{1-e^{-\tau s}}{s} = 0 + (Ls + R)\, I_x + MsI_z$$

Column 13, line 68, the middle equation of set (38) should read:

$$\frac{1-e^{-10^{-4}s}}{s} = 0 \quad + (0.5s + 50)\, I_x + 0.5\, ksI_z$$

UNITED STATES PATENT OFFICE
CERTIFICATE OF CORRECTION

Patent No. 3,651,282 Dated March 21, 1972

Inventor(s) Martin E. Gerry

It is certified that error appears in the above-identified patent and that said Letters Patent are hereby corrected as shown below:

Delete matter contained in Column 13, lines 71-75; and matter contained in Column 14, lines 1-7, and substitute the following therefor:

$$I_z = \frac{\begin{vmatrix} +(L_m s + R_m) & -0.5ks & -L_m i_{mo} \\ 0 & +(0.5s+50) & \dfrac{1-e^{-10^{-4}s}}{s} \\ 0 & +0.5ks & 0 \end{vmatrix}}{\begin{vmatrix} +(L_m s + R_m) & -0.5ks & -0.5ks \\ 0 & +(0.5s+50) & +0.5ks \\ 0 & +0.5ks & +(0.5s+50) \end{vmatrix}} \quad (39)$$

Delete matter contained in Column 14, lines 41-47, constituting determinant (43), and substitute the following therefor:

$$I_z = \frac{\begin{vmatrix} (.5s+50) & \dfrac{1-e^{-10^{-4}s}}{s} \\ .5ks & 0 \end{vmatrix}}{\begin{vmatrix} (.5s+50) & .5ks \\ .5ks & (.5ks+50) \end{vmatrix}} \quad (43)$$

PO-1050
(5/69)

UNITED STATES PATENT OFFICE
CERTIFICATE OF CORRECTION

Patent No. 3,651,282 Dated March 21, 1972

Inventor(s) Martin E. Gerry Page 5 of 5 pages

It is certified that error appears in the above-identified patent and that said Letters Patent are hereby corrected as shown below:

Column 14, lines 73-75, equation (46) should read:

$$I_z = \frac{-.45 + .45e^{-10^{-4}s}}{.0475s^2 + 50s + 2500} \qquad (46)$$

Column 15, lines 5-6, equation (48) should read:

$$i_z = \mathcal{L}^{-1} I_z = \frac{1}{2\pi j}\int_{-j\infty}^{+j\infty} I_z e^{st} ds = \sum \begin{matrix}\text{Residues at poles}\\ s= -52.6, -1000\end{matrix} \qquad (48)$$

Column 15, lines 37-38, equation (55) should read:

$$i_z = \mathcal{L}^{-1} I_z = \frac{1}{2\pi j}\int_{-j\infty}^{+j\infty} I_z e^{st} ds = \sum \begin{matrix}\text{Residues at poles}\\ s= -100.91, -101.11\end{matrix} \qquad (55)$$

Signed and sealed this 12th day of February 1974.

(SEAL)
Attest:

EDWARD M.FLETCHER,JR.
Attesting Officer

C. MARSHALL DANN
Commissioner of Patents